United States Patent [19]

Warner

[11] 4,351,925
[45] Sep. 28, 1982

[54] PROCESS FOR THE THERMAL STABILIZATION OF ACRYLIC FIBERS AND FILMS

[75] Inventor: Steven B. Warner, Bernardsville, N.J.

[73] Assignee: Celanese Corporation, New York, N.Y.

[21] Appl. No.: 257,712

[22] Filed: Apr. 27, 1981

Related U.S. Application Data

[62] Division of Ser. No. 141,706, Apr. 18, 1980, Pat. No. 4,295,844.

[51] Int. Cl.³ ............................................... C08F 8/32
[52] U.S. Cl. .................................... 525/369; 525/379; 528/481
[58] Field of Search ................. 525/379, 369; 8/115.5; 528/481

[56] References Cited

U.S. PATENT DOCUMENTS

| 2,758,003 | 8/1956 | Kleiner et al. | 8/115.5 |
| 3,767,773 | 10/1973 | Turner et al. | 8/115.5 |
| 3,814,577 | 6/1974 | Menikheim | 8/115.5 |
| 3,891,606 | 6/1975 | Kogon | 525/379 |
| 4,031,188 | 6/1977 | Kohler | 8/115.5 |
| 4,074,031 | 2/1978 | Johnson et al. | 525/379 |

FOREIGN PATENT DOCUMENTS 431181 11/1974 U.S.S.R. ............................ 525/369

*Primary Examiner*—William F. Hamrock
*Attorney, Agent, or Firm*—Charles B. Barris

[57] ABSTRACT

An improved process for the thermal stabilization of an acrylic fibrous material or film is provided. The fibrous material or film initially is contacted with aniline provided at an elevated temperature. Such aniline treatment (as described) has been found to render the fibrous material or film capable of undergoing thermal stabilization on a more expeditious basis. Subsequently the resulting fibrous material or film is heated in an oxygen-containing atmosphere at a temperature of approximately 200° to 360° C. until a stabilized fibrous material or film is formed.

12 Claims, No Drawings

PROCESS FOR THE THERMAL STABILIZATION OF ACRYLIC FIBERS AND FILMS

This is a division of application Ser. No. 141,706, filed Apr. 18, 1980 (now U.S. Pat. No. 4,295,844, granted Oct. 20, 1981).

BACKGROUND OF THE INVENTION

In the past procedures have been proposed for the conversion of fibers and films formed from acrylic polymers to a modified form processing enhanced thermal stability. Such modification has generally been accomplished by heating a fibrous material or film in an oxygen-containing atmosphere at a moderate temperature for an extended period of time.

U.S. Pat. Nos. 2,913,802 to Barnett, 3,285,696 to Tsunoda, and 3,539,295 to Ram disclose processes for the conversion of fibers of acrylonitrile homopolymers or copolymers to a heat resistant form. The stabilization of fibers of acrylonitrile homopolymers and copolymers in an oxygen-containing atmosphere involves (1) a chain scission and crosslinking reaction of adjoining molecules as well as (2) a cyclization reaction of pendant nitrile groups. It is generally recognized that the rate at which the stabilization reaction takes place increases with the temperature of the oxygen-containing atmosphere. However, the stabilization reaction must by necessity be conducted at relatively low temperatures (i.e. below about 300° C.), since the cyclization reaction is exothermic in nature and must be controlled if the original fibrous configuration of the material undergoing stabilization is to be preserved. Accordingly the stabilization reaction tends to be time consuming, and economically demanding because of low productivity necessitated by the excessive time requirements. Prior processes which may shorten the period required by the stabilization reaction include those disclosed in U.S. Pat. Nos. 3,416,874, 3,592,595, 3,647,770, 3,650,668, 3,656,882, 3,656,883, 3,708,326, 3,729,549, 3,767,773, 3,813,219, 3,814,577, 3,820,951, 3,850,876, 3,917,776, 3,923,950, 3,961,888, 4,002,426, and 4,004,053; British Pat. Nos. 1,280,850 and 1,478,775; and Soviet Author's Certificate Nos. 389,012.

While stabilized acrylic fibrous materials may be used directly in applications where a non-burning fiber is required, demands for the same have been increasingly presented by manufacturers of carbonized fibrous materials. Carbonized fibrous materials are commonly formed by heating a stabilized acrylic fibrous material in a non-oxidizing atmosphere such as nitrogen or argon, at a more highly elevated temperature. During the carbonization reaction elements such as nitrogen, oxygen, and hydrogen are substantially expelled. Accordingly, the term "carbonized" as used in the art commonly designates a material consisting of at least about 90 percent carbon by weight, and generally at least about 95 percent carbon by weight. Depending upon the conditions under which a carbonized fibrous material is processed, it may or may not contain graphitic carbon as determined by the characteristic x-ray diffraction pattern of graphite. See, for instance, commonly assigned U.S. Pat. Nos. 3,656,904, 3,723,605, 3,775,520, 3,900,556, and 3,954,950.

It is an object of the present invention to provide an improved process for forming thermally stabilized acrylic fibers and films.

It is an object of the present invention to provide an improved process for forming a thermally stabilized acrylic fibrous material or film which satisfactorily can be carried out on an accelerated basis and/or at a lower stabilization temperature.

It is an object of the present invention to provide an improved process for forming thermally stabilized acrylic fibers and films in which the undesirable exothermic nature of the stabilization reaction is controlled.

It is another object of the invention to provide an improved process for forming stabilized fibrous materials or films derived from acrylic polymers which results in a product which is suitable for carbonization, or carbonization and graphitization.

These and other objects, as well as the scope, nature, and utilization of the invention will be apparent from the following detailed description and appended claims.

SUMMARY OF THE INVENTION

It has been found that an improved process for the thermal stabilization of an acrylic fibrous material or film selected from the group consisting of an acrylonitrile homopolymer and acrylonitrile copolymers containing at least about 85 mol percent of acrylonitrile units and up to about 15 mol percent of one or more monovinyl units copolymerized therewith comprises:
(a) contacting the fibrous material or film with aniline provided at an elevated temperature whereby the fibrous material or film is rendered capable of undergoing thermal stabilization on a more expeditious basis, and
(b) heating the resulting fibrous material or film in an oxygen-containing atmosphere at a temperature of approximately 200° to 360° C. until a stabilized fibrous material or film is formed which is black in appearance, retains its original configuration substantially intact and which is non-burning when subjected to an ordinary match flame.

DESCRIPTION OF PREFERRED EMBODIMENTS

The acrylic shaped articles, i.e., fibers or films, undergoing stabilization in the present process may be formed by conventional solution spinning techniques (i.e., may be dry spun or wet spun) or by conventional solvent casting techniques, and are commonly drawn to increase their orientation. As is known in the art, dry spinning is commonly conducted by dissolving the polymer in an appropriate solvent, such as N,N-dimethylformamide or N,N-dimethylacetamide, and passing the solution through an opening of predetermined shape into an evaporative atmosphere (e.g., nitrogen) in which much of the solvent is evaporated. Wet spinning is commonly conducted by passing a solution of the polymer through an opening of predetermined shaped into a coagulation bath. Casting is commonly conducted by placing a solution containing the polymer upon a support, and evaporating the solvent therefrom.

The acrylic polymer utilized as the starting material is formed primarily of recurring acrylonitrile units. For instance, the acrylic polymer should generally contain not less than about 85 mol percent of acrylonitrile units and not more than about 15 mol percent of units derived from a monovinyl compound which is copolymerizable with acrylonitrile such as styrene, methyl acrylate, methyl methacrylate, vinyl acetate, vinyl chloride, vinylidene chloride, vinyl pyridine, and the like, or a plurality of such monomers. The pendant nitrile groups present within the acrylic shaped article (i.e., fiber or film) are substantially uncyclized.

The preferred acrylic precursor is an acrylonitrile homopolymer. Preferred acrylonitrile copolymers contain at least about 95 mol percent of acrylonitrile units and up to about 5 mol percent of one or more monovinyl units copolymerized therewith.

The acrylic precursor is preferably provided as a continuous length of fibrous material and may be in a variety of physical configurations. For istance, the acrylic fibrous materials may be present in the form of continuous lengths of multifilament yarns, tows, tapes, strands, cables, or similar fibrous assemblages. Alternatively, acrylic films of relatively thin thickness, e.g., about 1 to 10 mils, may be selected as the precursor.

When the starting material is a continuous multifilament yarn, a twist may beimparted to the same to improve the handling characteristics. For instance, a twist of about 0.1 to 5 tpi, and preferably about 0.3 to 1.0 tpi may be utilized. Also a false twist may be used instead of or in addition to a real twist. Alternatively, one may select bundles of fibrous material which possess substantially no twist.

The starting material may be drawn in accordance with conventional techniques in order to improve its orientation. For instance, the starting material may be drawn by stretching while in contact with a hot shoe at a temperature of about 140° to 160° C. Additional representative drawing techniques are disclosed in U.S. Pat. Nos. 2,455,173, 2,948,581, and 3,122,412. It is recommended that the acrylic fibrous materials selected for use in the process be drawn to a single filament tenacity of at least about 2.5 grams per denier. If desired, however, the starting material may be more highly oriented, e.g., drawn up to a single filament tenacity of about 7.5 to 8 grams per denier, or more. Acrylic films optionally may be either uniaxially or biaxially oriented.

Prior to heating the acrylic fibrous material or film in an oxygen-containing atmosphere to accomplish the desired stabilization (as described hereafter), the precursor is contacted with aniline at an elevated temperature whereby the fibrous material or film is rendered capable of undergoing thermal stabilization on a more expeditious basis. In a preferred embodiment the fibrous material or film is contacted with a dilute solution of aniline which is provided at an elevated temperature. In a particularly preferred embodiment the fibrous material or film is contacted with a dilute solution of aniline and a Group IA metal hydroxide which is provided at an elevated temperature.

Representative solvents which can be used to form the solution utilized in a preferred embodiment include water and an alcohol having 1 to 3 carbon atoms (e.g., methanol, ethanol, ethylene glycol, propanol, and isopropanol). Any solvent can be selected which dissolves the aniline or aniline and Group IA metal hydroxide and does not deleteriously influence the acrylic fibrous material or film.

Representative Group IA metal hydroxides which can be included with the dissolved aniline in preferred embodiments include lithium hydroxide, sodium hydroxide, and potassium hydroxide. The particularly preferred hydroxide is potassium hydroxide.

In preferred embodiments the aniline at the time of contact with the acrylic fibrous material or film is dissolved in a concentration of approximately 5 to 15 percent by weight (e.g., approximately 10 percent by weight) based upon the total weight of the solution, and the Group IA metal hydroxide is dissolved in a concentration of approximately 0.5 to 5 percent by weight (e.g. approximately 3 percent by weight) based upon the total weight of the solution.

The acrylic fibrous material or film at the time of contact with aniline preferably is provided at substantially atmospheric pressure. However, superatmospheric conditions alternatively may be employed. Representative elevated temperatures during contact range from approximately 50° to 200° C. In a preferred embodiment the temperature during contact is approximately 50° to 100° C. When water is employed as solvent, the particularly preferred temperature at the time of contact is 100° C. The residence time for the contact commonly will vary with temperature, the degree of access to the surfaces of individual fibers, and the chemical composition of the acrylic precursor undergoing such preliminary treatment. Representative residence times commonly range from 5 to 30 minutes. Such contact renders the acrylic fibrous material or film capable of undergoing thermal stabilization on a more expeditious basis. Commonly the acrylic precursor turns from a white or off-white color to a pale yellow color during the contact wiht aniline at an elevated temperature.

Excess aniline or solution of aniline adhering to the surface of the acrylic fibrous material or film preferably is removed following such contact. The removal can be accomplished in accordance with any convenient technique. For instance, the fibrous material or film may be rinsed with a dilute solution of acid followed by rinsing with water. Representative acids include hydrochloric acid, sulfuric acid, and nitric acid. Hydrochloric acid is particularly preferred because of its volatile nature which enables ease of removal. Following rinsing the fibrous material may be dried outside the thermal stabilization zone, or such drying can be deferred and carried out in the same zone in which the thermal stabilization is accomplished.

The resulting fibrous material or film is heated in an oxygen-containing atmosphere preferably at a temperature of approximately 200° to 360° C. until a stabilized fibrous material or film is formed which is black in appearance, retains its original configuration substantially intact and which is non-burning when subjected to an ordinary match flame. The oxygen-contaiing atmosphere may be pure oxygen or a combination of oxygen and a substantially inert gas or gases. For instance, oxygen can be provided in a concentration of approximately 20 to 40 percent by volume. The particularly preferred oxygen-containing atmosphere is air because of ease of operating considerations. The oxygen-containing atmosphere preferably is circulated during the stabilization reaction so as to remove gaseous by-products formed. Particularly preferred temperatures for the oxygen-containing atmosphere commonly range from approximately 200° to 315° C. The optimum temperature selected will be influenced to some degree by the chemical composition of the acrylic precursor. For instance, when a substantial concentration of copolymerized monovinyl units are present, then the precursor may soften at a lower temperature and it will be desirable to employ a stabilization temperature at the lower end of the stabilization temperature range indicated. If desired, the fibrous material or film may be exposed to a temperature gradient wherein the temperature progressively is increased. In a preferred embodiment the acrylic fibrous precursor is maintained at a substantially constant length during the aniline treatment and while heated in an oxygen-containing atmosphere. Also, the dimensions of a film precursor preferably are maintained substantially constant when undergoing the corresponding processing.

The theory whereby the initial aniline treatment is capable of expediting the desired thermal stabilization is considered to be complex and incapable of simple explanation. In some manner the aniline is believed to promote in a controlled manner the cyclization of pendant nitrile groups of the acrylic precursor, and the additional presence of a Group IA metal hydroxide to further enhance this result. It is amply apparent, however, that the time required to complete the thermal stabilization reaction in an oxygen-containing atmosphere following the aniline treatment may be reduced by approximately 30 percent. Also, differential scanning calorimeter analysis indicates that the usual exothermic tendency of the stabilization reaction is substantially reduced thereby minimizing the danger of yielding a rapid uncontrollable runaway exothermic reaction in which the original configuration is destroyed. Accordingly, one may carry out the stabilization reaction while employing a reduced residence time and with greater flexibility in selection of temperature. Suitable residence times for heating in the oxygen-containing atmosphere commonly range from approximately 0.5 to 5 hours. The residence time for an acrylic precursor will be influenced by the specific chemical composition of the same, the denier of the fibers involved, and the thickness of the film involved.

The progress of the thermal stabilization reaction in an oxygen-containing atmosphere can be monitored by observing the degree of color change as the fibrous material is heated in the oxygen-containing atmosphere. For instance, if acrylic fibers are heated in a circulating air oven for 9 minutes at 245° C. in the absence of the aniline treatment they commonly are observed to be bright yellow in color. In contrast if acrylic fibers following the aniline treatment of the present invention are heated in a circulating air oven for 9 minutes at 245° C. they commonly are deep rust in color. The fully stabilized material is black in appearance.

The stabilized fibrous material resulting from the stabilization treatment of the present invention is suitable for use in applications where a fire resistant fibrous material is required. For instance, nonburning fabrics may be formed from the same. As previously indicated, the stabilized acrylic fibrous materials are particularly suited for use as intermediates in the production of carbonized fibrous materials. For instance, the stabilized fibrous material may be heated in accordance with techniques known in the art in a non-oxidizing gaseous atmosphere (e.g., nitrogen, argon, helim) at a temperature of at least approximately 1000° C. until a carbonaceous fibrous material is formed which contains at least 90 percent carbon by weight (e.g., at least 95 percent carbon by weight). Such amorphous carbon or graphitic carbon fibrous products may be incorporated in a binder or matrix and serve as a reinforcing medium. The carbon fibers may accordingly serve as a lightweight load bearing component in high performance composite structures which find particular utility in the aerospace industry.

The stabilized film resulting from the stabilization treatment is suitable for use in applications where a fire resistant sheet material is required. Such stabilized films may also be utilized as intermediates in the production of carbonized films where undergoing processing analogous to that of the stabilized fibrous material. Such carbonized films may be utilized in the formation of lightweight high temperature resistant laminates when incorporated in a matrix material (e.g., an epoxy resin).

The following example is given as a specific illustration of the invention. It should be understood, however, that the invention is not limited to the specific details set forth in the example.

EXAMPLE

The precorsor selected is a dry spun continuous filament acrylonitrile copolymer tow commercially available from DuPont under the designation of Orlon acrylic fiber. The fibrous precursor contains about 95 mol percent acrylonitrile units and about 5 mol percent copolymerized methacrylate units. The two exhibits an average single filament tenacity of approximately 2.8 grams per denier.

The two is passed for a residence time of 10 minutes in the direction of its length through an aqueous bath containing 10 percent by weight of dissolved aniline, and 2.8 percent by weight dissolved potassium hydroxide based upon the total weight of the solution. At the time of such contact between the acrylic fibrous material and the bath the bath is maintained at its boiling point (i.e., 100° C.) under reflux conditions. While passing through the bath, the fibrous material is maintained at a substantially constant length and changes from white to pale yellow in color. Such aniline treatment renders the fibrous material capable of undergoing subsequent thermal stabilization on a more expeditious basis.

The tow is passed for 4 minutes through an aqueous bath containing 3 percent by weight concentrated (i.e., 37 percent) hydrochloric acid maintained at its boiling point (i.e., 100° C.) under reflux conditions, and then for 4 minutes through a bath containing distilled water which is provided at room temperature (i.e., 25° C.). In the hydrochloric acid bath aniline adhering to the fibrous material is neutralized and removed by rinsing, and in the final water bath this rinsing is continued.

The two next is passed for a residence time of three hours through a circulating air oven provided at 240° C. during which time a stabilized fibrous material is formed which is black in appearance, retains its original fibrous configuration substantially intact and which is nonburning when subjected to an ordinary match flame. The stabilization reaction proceeds smoothly on an expedited basis with no evidence of an undesirable exothermic reaction.

The tow next is carbonized by passage through an Inductotherm induction furnace utilizing a 20 KW power source. The induction furnace comprises a water cooled cooper coil and a hollow graphite tube suspended within the coil having a length of 38 inches and an inner diameter of 0.75 inch through which the continuous length of stabilized tow continuously is passed. The copper coil which encompasses a portion of the hollow graphie tube is positioned at a location essentially equidistant from the respective ends of the graphite tube. A non-oxidizing atmosphere of nitrogen is maintained within the induction furnace. Air is substantially excluded from the induction furnace by purging with nitrogen. A longitudinal tension of 0.2 gram per denier is exerted upon the continuous length of fibrous maerial as it passes through the induction furnace. The fibrous material is at a temperature of about 150° C. as it enters the induction furnace and it is raised to a temperature of 800° C. in about 150 seconds, and from 800° C. to 1500° C. in about 200 seconds where it is maintained at 1500°±25° C. for about 48 seconds. The resulting carbon fibers contain in excess of 90 percent carbon by weight and possess satisfactory tensile properties.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. An improved process for the thermal stabilization of an acrylic film selected from the group consisting of an acrylonitrile homopolymer and acrylonitrile copolymers containing at least about 85 mol percent of acrylonitrile units and up to about 15 mol percent of one or more monovinyl units copolymerized therewith comprising:
   (a) contacting said film with a dilute solution of aniline and Group IA metal hydroxide which is provided at an elevated temperature for a residence time of approximately 5 to 30 minutes whereby said film is rendered capable of undergoing thermal stabilization on a more expeditious basis,
   (b) removing the excess quantity of said solution adhering to said film following said contact, and
   (c) heating said resulting film in an oxygen-containing atmosphere at a temperature of approximately 200° to 360° C. until a stabilized film is formed which is black in appearance, retains its original configuration substantially intact and which is non-burning when subjected to an ordinary match flame.

2. An improved process according to claim 1 wherein said acrylic film is an acrylonitrile homopolymer.

3. An improved process according to claim 1 wherein said acrylic film is an acrylonitrile copolymer containing at least about 95 mol percent acrylonitrile units and up to about 5 mol percent of one or more monovinyl units copolymerized therewith.

4. An improved process according to claim 1 wherein the solvent for said dilute solution of aniline and Group IA metal hydroxide is water.

5. An improved process according to claim 1 wherein the solvent for said dilute solution of aniline and Group IA metal hydroxide is an alcohol having 1 to 3 carbon atoms.

6. An improved process according to claim 1 wherein said dilute solution of aniline and Group IA metal hydroxide contains aniline in a concentration of approximately 5 to 15 percent by weight based upon the total weight of the solution and Group IA metal hydroxide in a concentration of 0.5 to 5 percent by weight based upon the total weight of the solution.

7. An improved process according to claim 1 wherein said Grpoup IA metal hydroxide is potassium hydroxide.

8. An improved process according to claim 1 wherein said dilute solution of aniline and Group IA metal hydroxide is provided at a temperature of approximately 50° to 200° C. at the time of said contact.

9. An improved process according to claim 1 wherein said dilute solution of aniline and Group IA metal hydroxide is provided at a temperature of approximately 50° to 100° C. at the time of said contact.

10. An improved process according to claim 1 wherein said step (b) comprises rinsing with a dilute solution of acid followed by rinsing with water.

11. An improved process according to claim 1 wherein said oxygen-containing atmosphere of step (c) is air.

12. An improved process acccording to claim 1 which includes the additional step of heating said stabilized film in a non-oxidizing atmosphere at a temperature of at least approximately 1000° C. until a carbonaceous film is formed which contains at least 90 percent carbon by weight.

* * * * *